(12) United States Patent
Cipollini

(10) Patent No.: US 6,379,827 B1
(45) Date of Patent: Apr. 30, 2002

(54) INERTING A FUEL CELL WITH A WETTABLE SUBSTRATE

(75) Inventor: Ned E. Cipollini, Enfield, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 09/571,446

(22) Filed: May 16, 2000

(51) Int. Cl.[7] .................................................. H01M 8/00
(52) U.S. Cl. ............................. 429/13; 429/25; 429/26; 429/34; 429/12; 429/40; 429/38; 429/30
(58) Field of Search ............................. 429/13, 25, 26, 429/34, 12, 40, 38, 30

(56) References Cited

U.S. PATENT DOCUMENTS

| | | | |
|---|---|---|---|
| 4,233,181 A | 11/1980 | Goller et al. | 252/425.3 |
| 5,503,944 A | 4/1996 | Meyer et al. | 429/13 |
| 5,641,586 A | 6/1997 | Wilson | 429/30 |
| 5,700,595 A | 12/1997 | Reiser | 429/13 |
| 5,840,414 A | 11/1998 | Bett et al. | 428/307.7 |
| 5,853,909 A | * 12/1998 | Reiser | 429/13 |
| 6,127,057 A | * 10/2000 | Gorman | 429/25 |

* cited by examiner

Primary Examiner—Stephen Kalafut
Assistant Examiner—Angela J. Martin
(74) Attorney, Agent, or Firm—Stephen A. Schneeberger

(57) ABSTRACT

A fuel cell system (10) having a membrane/electrode assembly (MEA) (16) is provided with the means and technique for quickly inerting the MEA without requiring a nitrogen purge. A first fine pore plate (14) is positioned at an anode side of the MEA and defines a coolant flow field (36) and typically also, a fuel reactant flow field (48). A second fine pore plate (12) is positioned at a cathode side of the MEA and defines a lo coolant flow field (36) and typically also, an oxidant reactant flow field (38). A respective wettable substrate (22,26) is positioned between the MEA and each of the first and second fine pore plates, and is adjacent to the fine pore plates. Various means (50,56,61,60,70,78,66,54,77) drive and control the oxidant flow field, the fuel reactant flow field, and the coolant flow field such that the pressure of the two reactant flow fields is sufficiently greater ($\Delta P_1$) than the pressure of the coolant flow field during on load operation to substantially exclude coolant from the reactant flow fields and limit the availability of coolant to the wettable substrates. However, those means drive and control the reactant flow fields and the coolant flow field to such relative pressures ($\Delta P_2$) during shutdown and start-up (e. g., small or zero differential near ambient) as to allow coolant to flood the wettable substrates, and in some instances also the reactant flow fields, and thereby protectively inert the system.

20 Claims, 7 Drawing Sheets

INERTING A FUEL CELL WITH A WETTABLE SUBSTRATE

TECHNICAL FIELD

This invention relates generally to fuel cells, and more particularly to a system and method of inerting a fuel cell utilizing a wettable substrate associated with the anode and/or cathode of the fuel cell.

BACKGROUND ART

Fuel cell systems are electrochemical power sources for both stationary and mobile applications. One type of fuel cell employing a solid polymer electrolyte membrane (PEM) has shown particular promise as an automotive power source. That type of fuel cell includes a membrane/electrode assembly (MEA), with fuel, oxidant and coolant flow fields adjacent to the anode and cathode electrodes. The PEM fuel cells operate at relatively low temperatures, thus facilitating their application to automotive uses. Fuel cells do, however, have a characteristic that may present a drawback, particularly in automotive applications which typically require frequent shutdown and startup of the fuel cell.

Unless the fuel cell is in some way purged or otherwise inerted when it is being shutdown or even started up, undesirable processes and reactions may occur, or continue to occur. If the MEA of the fuel cell is not protected, as by inerting the anode and/or cathode flow fields by flooding with a purge gas, the electrochemical process may continue in some form and lead to undesirable results. Normally it is intended for the output voltage from the fuel cell to be reduced or terminated at shutdown, however the failure to inert may allow the process to continue in a way that depletes fuel volume on the anode side and creates a vacuum. If the system is not sufficiently leak tight, air may be drawn into the fuel side and lead to unwanted results.

It has been observed that the failure to adequately inert a fuel cell system may allow a fuel/oxidant (air) interface to exist, even if temporarily, at regions in the fuel cell, and such interface may lead to serious degradation in the performance and life of the cell. Indeed, even a fuel/nitrogen interface may have some deleterious affect on the fuel cell in this latter regard.

Although the desirability of inerting fuel cells is well known and has typically been accomplished through the use of an inert purge gas such as nitrogen, that particular process may detract from the overall economics and efficiency of fuel cell use. More particularly, the need to obtain, transport and/or frequently refill a source of inerting gas such as nitrogen is a significant obstacle to the acceptance and use of fuel cells as an automotive power source. To mitigate or avoid this obstacle, other techniques have been advanced as alternatives to the use of inert purge gas to inert fuel cells.

In one alternative, described in U.S. patent application Ser. No. 09/133,768, filed Aug. 8, 1998 for "Self-Inerting Fuel Cell System", and assigned to the assignee of the present invention, fuel, oxidant and coolant are individually controlled and caused to flow through respective flow fields in fine pore plates adjacent the anode and cathode sides of a membrane/electrode assembly in a PEM type fuel cell. Through selective control of the relative pressures of the fluids in the respective fuel, oxidant and coolant flow fields, coolant is permitted, at shutdown, to migrate through the fine pore plates and flood the fuel and oxidant (collectively "reactants") flow fields, thereby displacing the reactants and inerting the fuel cell system.

While the aforementioned Self-Inerting system of U.S. Ser. No. 09/133,768 does provide a means of inerting a fuel cell without requiring the cost and inconvenience of a nitrogen purge, it relies solely on the mechanism of the coolant migrating through the fine pore plates and displacing (i.e., purging) the reactants. Although the mechanism of coolant migrating through fine pore plates may provide a speed advantage over a serial purge, especially in the instance of lengthy runs of serial, or serially-cascaded, reactant flow paths, such mechanism may nevertheless possess some limit in the speed at which it displaces the reactants, and that displacement mechanism is also its dominant, or even sole, mode of protecting the cell. Moreover, that mechanism may cause flooding of the reactant flow fields to a greater extent than is desired for efficient start up/re-start.

In view of the foregoing, it is an object of the present invention to provide a fuel cell inerting system which overcomes the drawbacks and disadvantages of prior fuel cell systems. Other objects and advantages of this invention will become more readily apparent when the following description is read in conjunction with the accompanying drawings.

DISCLOSURE OF INVENTION

The present invention is a system for protecting fuel cells, especially of the PEM type, particularly during transient periods, such as during shutdown and/or start-up.

Accordingly, the present invention relates to an inerting system, both method and apparatus, for a fuel cell of the type that has a membrane/electrode assembly (MEA), which MEA includes anode and cathode electrode catalyst layers on respective opposite sides of the membrane, and a respective support plate comprising a respective substrate at at least one, and typically both, of the anode and cathode catalyst layers. In accordance with the invention, at least one of the support plate substrates is wettable, or hydrophilic. At least one fine pore plate is positioned adjacent a respective at least one wettable substrate, and serves to define a coolant flow field. A respective reactant flow field is also provided adjacent the wettable substrate, and is typically also defined by the fine pore plate, or by the wettable substrate in combination with the fine pore plate. The coolant flow field is spaced farther from the membrane relative to the reactant flow field. During operation of the fuel cell with an electrical load connected, and referred to as being "on load", the reactant flow field is operated at a first pressure and the coolant flow field is operated at a second pressure lower than the first pressure to create a first pressure differential sufficient to prevent coolant from flooding the reactant flow fields and wettable substrates. However, during fuel cell shutdown, the reactant flow field is operated at a third pressure and the coolant flow field is operated at a fourth pressure, the fourth pressure being such, relative to the third pressure, to create a second pressure differential therebetween such that the coolant is caused, or allowed, to migrate through the respective fine pore plate and flood the respective wettable substrate to isolate the respective catalyst layer of the MEA from the respective reactant.

Each wettable substrate has small pores, typically 90% of the pores being between 20 and 50$\mu$ (microns), and is of relatively small volume compared to the fine pore plates, such that capillary forces may be utilized to facilitate the rapid transfer of coolant to the substrate under the appropriate pressure conditions.

In a representative arrangement, respective support plates are provided adjacent the respective anode and cathode sides of the MEA. Each support plate comprises a wettable substrate and, at least the cathode support plate, also a non-wettable diffusion layer. Moreover, there is a fine pore plate positioned adjacent each of the wettable substrates, with a fuel reactant flow field being positioned on the anode side and an oxidant reactant flow field being positioned on the cathode side, as well as each also having a coolant flow field. Each of those reactant flow fields operates at a pressure higher than the coolant flow field during on load operation of the fuel cell. During shutdown, the gas supplies to the reactant flow fields are stopped so that the flow fields come to ambient pressure, as may also be done with the coolant flow field.

If desired, an additional, supplemental inerting of the system may be obtained by controlling the coolant to also flood the reactant flow fields in accordance with the disclosure of the aforementioned Self-Inerting system of U.S. Ser. No. 09/133,768, which disclosure is incorporated herein by reference.

Provision may be made for purging the fuel flow field with air during fuel cell shutdown, after the fuel flow field has attained ambient pressure.

Moreover, the fuel cell may be started, or restarted, from the inerted shutdown state by setting the reactant and coolant flow fields at substantially equal pressures to flood, or maintain flooded, the wettable substrates; then purging the reactant flow field with the respective reactant until the flow field contains a homogeneous mixture of the respective reactant; and then operating the coolant flow field at a pressure level relatively lower than the pressure level of the respective reactant flow field to un-flood the respective wettable substrate.

The foregoing features and advantages of the present invention will become more apparent in light of the following detailed description of exemplary embodiments thereof as illustrated in the accompanying drawings.

BEST MODE FOR CARRYING OUT THE INVENTION

Figure 1:
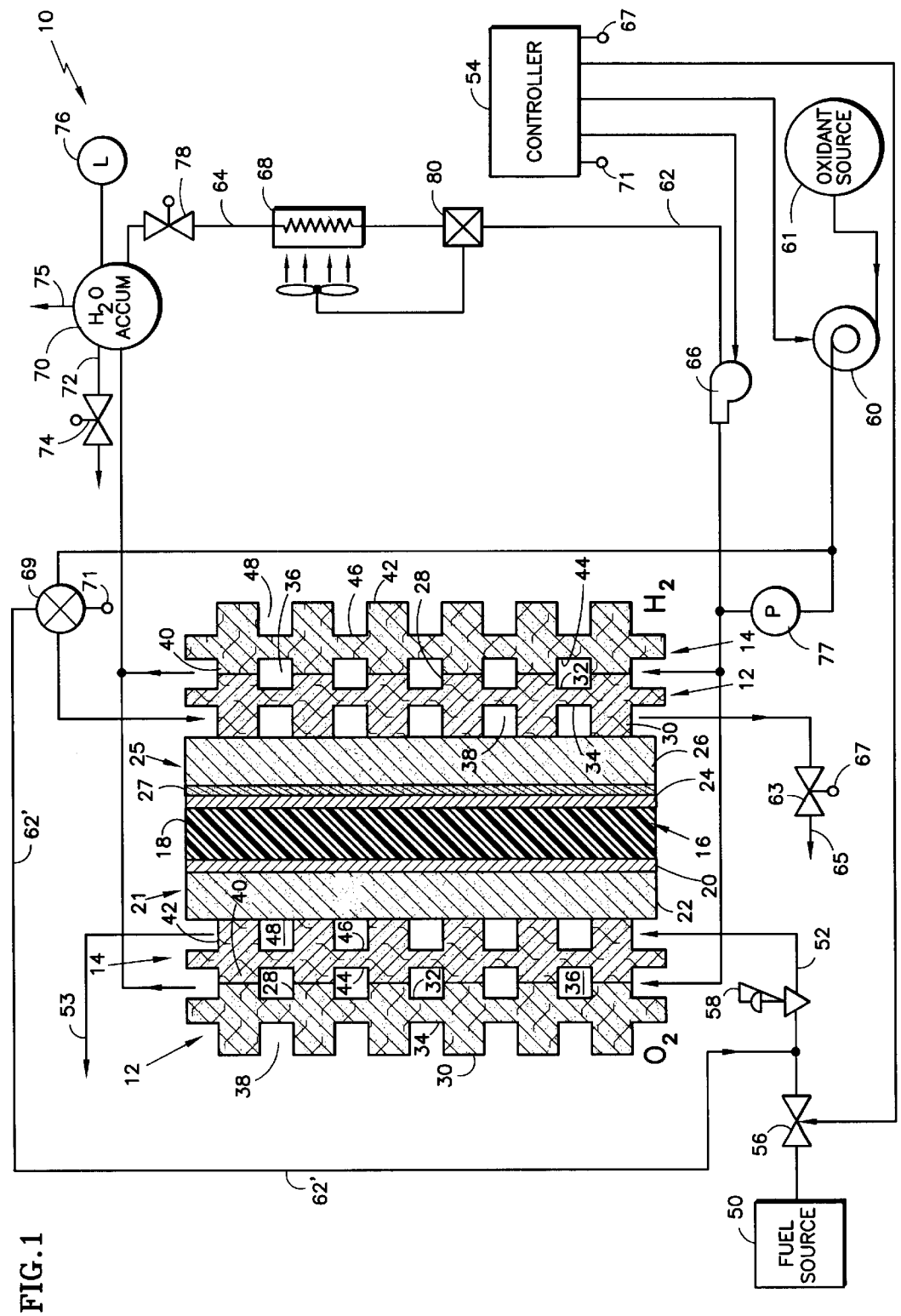
FIG. 1 is a schematic diagram, partly in section, of one of the cells in a PEM fuel cell power plant system in accordance with the present invention.
Figure 2:
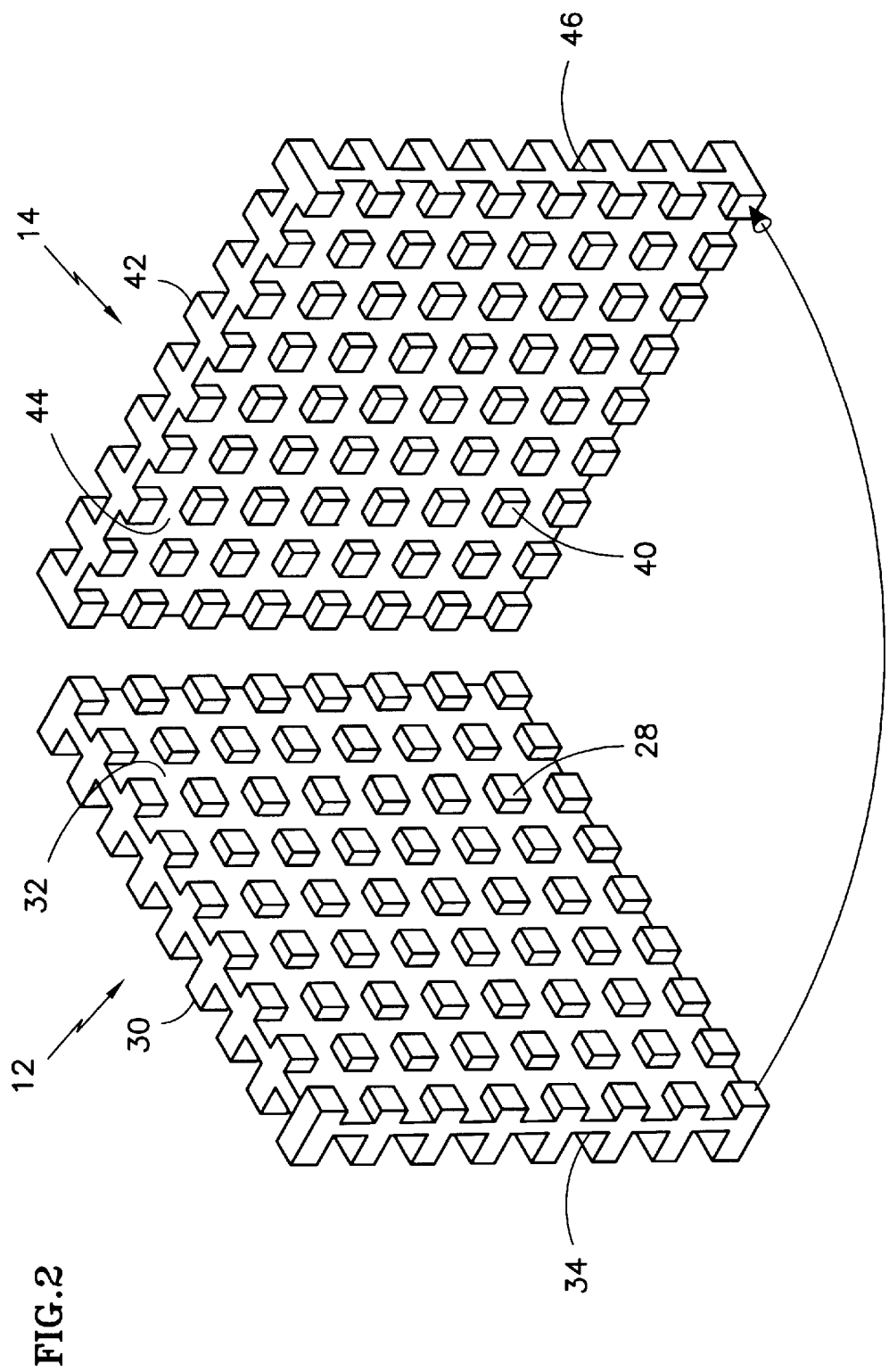
FIG. 2 is an exploded perspective view of two channeled conductor plates used to form reactant and coolant water flow passages in the fuel cell system of the invention.

Referring to FIG. 1, a fuel cell power plant or System in accordance with the present invention is generally designated by the reference numeral 10. The system 10 as depicted in FIG. 1 illustrates one cell which is repeated throughout a fuel cell stack. As best shown in FIG. 2, the system 10 includes fine pore, flow field plates 12 and 14 which are used to form the reactant and coolant or water circulating flow fields when bonded together. These flow field plates are sometimes also referred to as "water transfer plates". The characteristics and operation of a fuel cell system using such flow field plates is more fully set forth in U.S. Pat. Nos. 5,503,944 to Meyer et al and 5,853,909 and 5,700,595 to Reiser, the disclosures of which are incorporated herein by reference. The system 10 has an ion-exchange membrane/electrode assembly (MEA) 16 which includes a polymer electrolyte membrane (PEN) 18, an anode catalyst layer 20 on the anode side of the membrane 18, and a cathode catalyst layer 24 on the cathode side of the membrane 18. An anode support plate 21 is positioned adjacent the anode catalyst layer 20, and a cathode support plate 25 is positioned adjacent the cathode catalyst layer 24. As depicted in FIG. 1, the anode support plate 21 includes a hydrophilic (wettable) anode substrate 22 in accordance with the invention. The cathode support plate 25 also includes a hydrophilic cathode substrate 26 and further, a hydrophobic (non-wettable) cathode diffusion layer 27. The properties and functioning of the hydrophilic anode and cathode substrates 22 and 26 will be described in greater detail hereinafter.

A set of the flow field plates 12 and 14 are provided in back-to-back relationship on each side of the MEA 16, outward of the anode and cathode support plates 21,25. As best shown in FIG. 2, opposite surfaces of the plate are provided with a pattern of projections 28 and 30 which form a network of grooves 32 and 34 on opposite sides of the plate 12. The grooves 32 form a portion of a coolant water flow field 36 in the stack, and the grooves 34 form a cathode or oxidant reactant flow field 38 for each cell of the stack. The plate 14 is also formed with projections 40 and 42, and a network of grooves 44 and 46 on its opposite surfaces. The grooves 44 form a portion of the water coolant flow field 36, and the grooves 46 form an anode or fuel reactant flow field 48 for each cell in the stack. For simplicity of illustration, the cathode and the anode flow fields 38,48 are shown in FIG. 1 as extending in the same direction, but preferably actually extend in perpendicular directions to each other. Moreover, the projections 40 and 42 and the grooves 44 and 46 may be of a variety of shapes and configurations other than as shown.

As shown in FIG. 1, the flow field plates 12 and 14 are positioned back-to-back with the projections 28 and 40 being disposed in face-to-face contact. The grooves 32 and 44 combine to form the coolant water flow fields 36 on the anode and cathode sides of the electrolyte membrane 18. The projections 42 abut the anode substrate 22, and the projections 30 abut the cathode substrate 26. The grooves 46 thus form the anode reactant flow field 48, and the grooves 34 form the cathode reactant flow field 38.

Each of the plates 12 and 14 is preferably formed from a porous graphite composite which will provide fine pores on the order of about 0.4 to $2\mu$ (microns) median diameter. The degree of porosity will promote water migration from an intercellular coolant water flow field to an anode side of the MEA 16 and also away from the cathode side of the MEA 16 and into the next adjacent coolant water flow field. The plates 12,14 thus provide coolant water on demand to the anode side of the MEA to prevent the latter from drying out, to humidify incoming fuel and oxidant gases, and also to remove water from the cathode side of the MEA 16 to prevent the cathode from flooding. Each cell in the stack has its own dedicated water coolant flow field 36 and is thus provided with the necessary amounts of water on demand as required by the ongoing cell conditions, which may vary from cell to cell in the stack at any particular time, during operation of the stack.

Figure 3A:
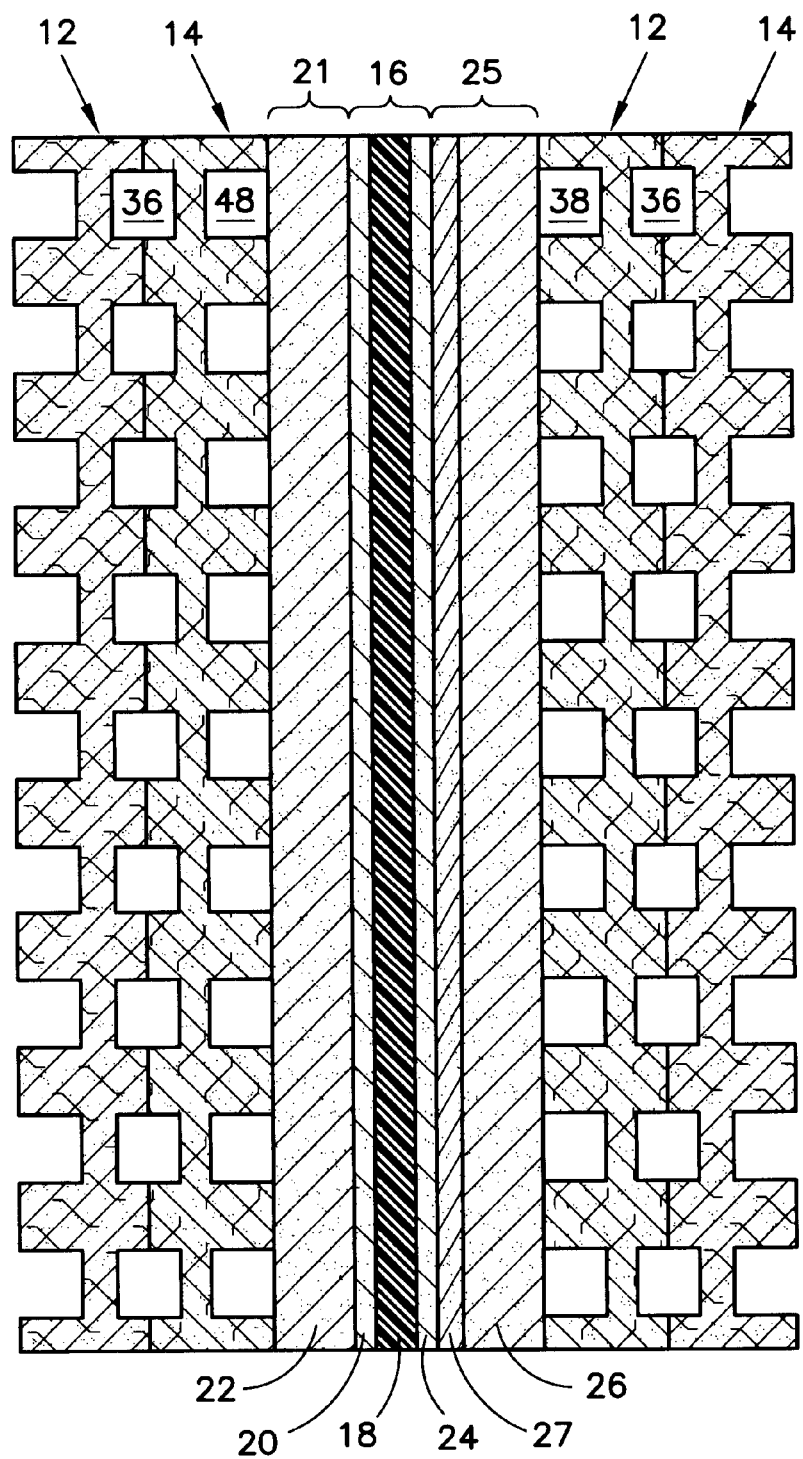
FIG. 3A is an enlarged view of a portion of FIG. 1, showing hydrophilic (wettable) substrate layers in both the anode and cathode support plates of the fuel cell, and a hydrophobic (non-wettable) diffusion layer in only the cathode support plate.

Referring to FIG. 3A, the anode support plate 21 and cathode support plate 25 are shown in greater detail. As previously mentioned, the anode substrate 22 and cathode substrate 26 are hydrophilic, in accordance with the invention. Although the use of hydrophilic substrates is known, as for example in U.S. patent application Ser. No. 09/466,701 filed Dec. 17, 1999 for "Fuel Cell Having a Hydrophilic Substrate" and assigned to the assignee of the present invention and incorporated herein by reference, and in U.S. Pat. No. 5,641,586 to M. S. Wilson for "Fuel Cell with Interdigitated Porous flow Field", their use for inerting a fuel cell system was neither disclosed nor appreciated. In the present invention, the hydrophilic anode and cathode substrates 22 and 26, respectively, are comprised of a porous carbon-carbon fibrous composite having a thickness of about 150 to 175 microns (0.006 to 0.007 inches) and a porosity of about 65% to 75%, with an average pore size of about 27 microns to 37 microns, and about 90% of the pores being in the range of 20 microns to 50 microns. An example of such a substrate is that distributed by the Toray Company of New York, N.Y., with the grade identification TGP-H-060. The substrate can be made wettable by any suitable process, as by the addition of certain metal oxide or hydroxide compounds, such as tin oxide, aluminum oxide and/or others, as for example disclosed in U.S. Pat. No. 5,840,414 to Bett et al and the aforementioned U.S. Ser. No. 09/466,701. The hydrophilic substrates 22 and 26 are thus provided with the capability of readily absorbing water, and are termed "wettable".

Figure 3B:
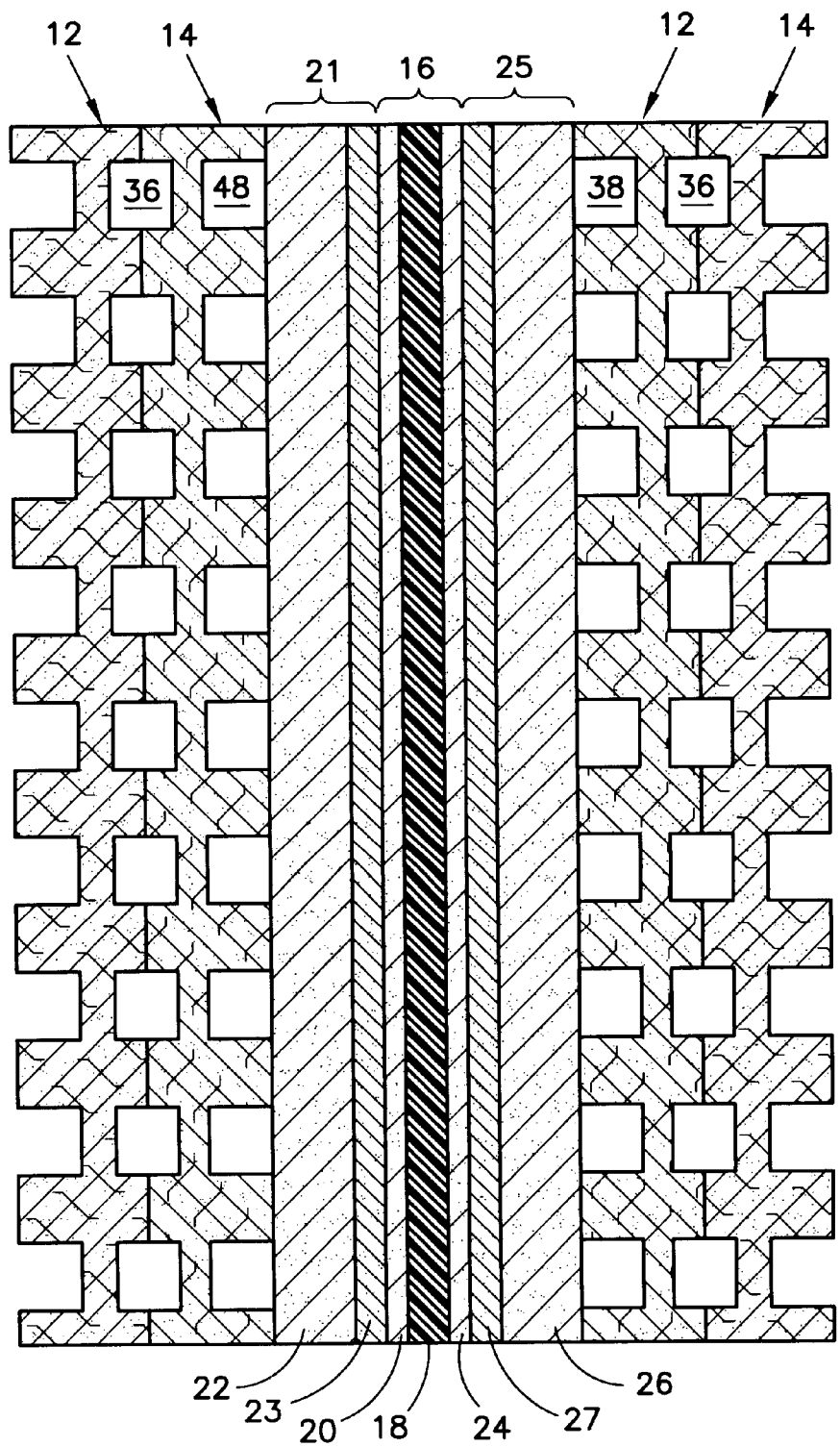
FIG. 3B illustrates an alternative to FIG. 3A, showing hydrophilic substrate layers and hydrophobic diffusion layers in both the anode and cathode support plates.
Figure 3C:
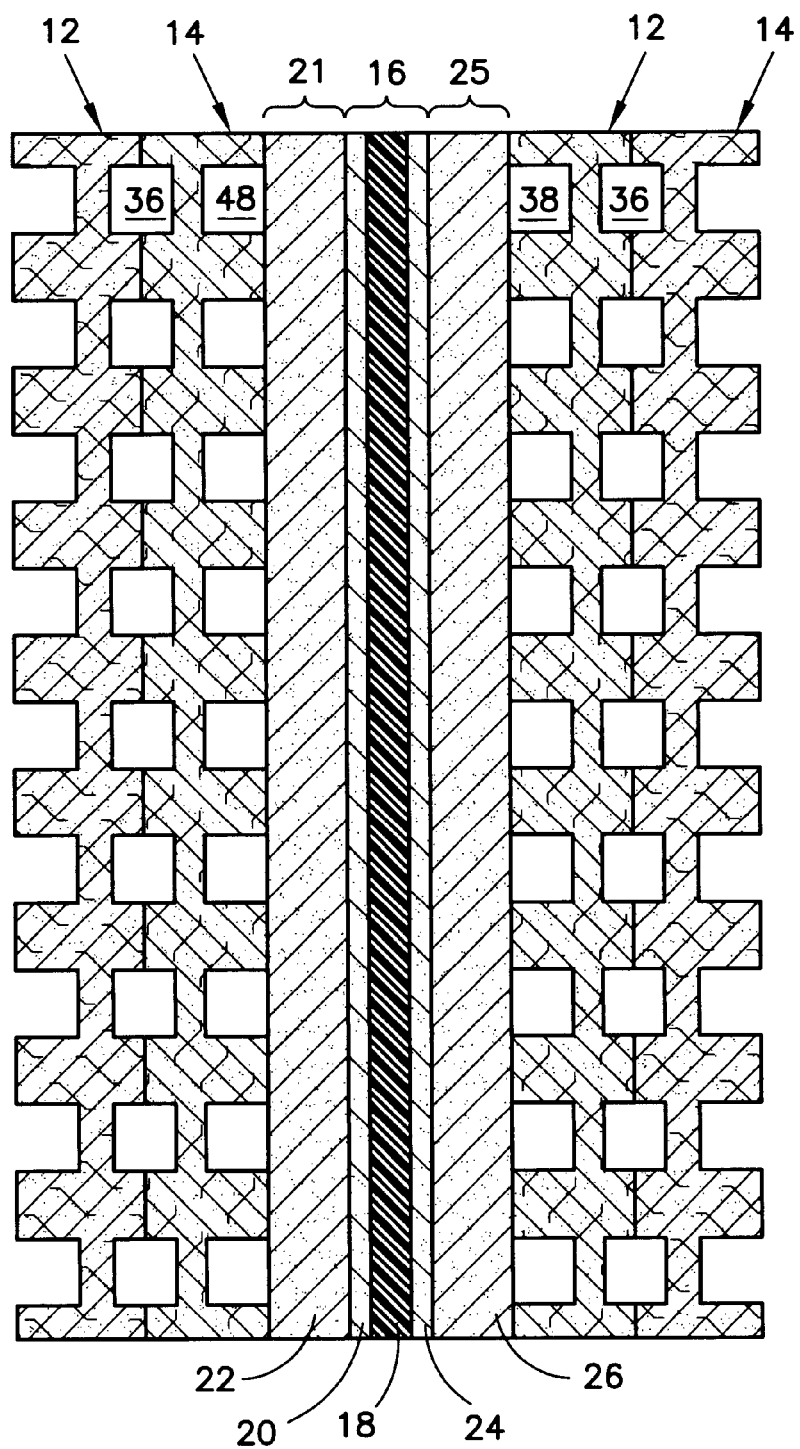
FIG. 3C illustrates a further alternative to FIGS. 3A and 3B, showing only hydrophilic substrate layers in both the anode and cathode support plates.

Conversely, the diffusion layer, specifically the cathode diffusion layer 27 in FIG. 3A, is partly or totally hydrophobic, and is termed "non-wettable" or "wet-proofed". The diffusion layer 27 is applied to the cathode substrate layer 26 by procedures well known in the art. A preferable procedure is that which is described in U.S. Pat. No. 4,233,181, which is owned by the assignee of the present invention and hereby incorporated by reference. FIG. 3B depicts an alternative embodiment, having a cathode diffusion layer 27 between the cathode substrate layer 26 and cathode catalyst layer 24, and an anode diffusion layer 23 between the anode substrate layer 22 and the anode catalyst layer 20. A still further embodiment is depicted in FIG. 3C, in which neither the anode nor the cathode support plates 21,25 contain a diffusion substrate.

The diffusion layer 27 and/or 23 is constructed of a porous conductive layer of carbon particulate having a pore size less than or equal to about 10 microns and a porosity equal to or greater than 40%. In order to render the diffusion layer hydrophobic, or partly hydrophobic, a hydrophobic polymer is mixed with a porous carbon black layer. The relative amount of hydrophobic polymer determines the relative degree of "non-wettability" of the diffusion layer. The resultant mixture is heated to about the melting point of the hydrophobic polymer, as is known in the art. A suitable polymer is polytetrafluoroethylene (PTFE), such as the type manufactured by E. I. Dupont deNemours of Wilmington, Del. under the tradename Teflon®. The diffusion layer may typically have a thickness of about 20 to 80 microns, such that it is substantially thinner than the substrate layer. The diffusion layer serves to readily pass reactant gases to the MEA 16.

All of the anode reactant flow fields 48 in the system 10 are supplied with a hydrogen gas reactant from a pressurized fuel source 50, such as a supply tank. The fuel source 50 may be a fuel processing system, which is well known to those skilled in this art. The fuel processing system converts an organic fuel such as natural gas or gasoline into a hydrogen rich stream. The hydrogen reactant flows from the supply tank 50 to the anode flow fields 48 through a supply line 52, and the anode exhaust leaving the anode flow fields 48 is directed by an exhaust line 53 to a burner (not shown). The pressure of hydrogen flowing through the supply line 52 is controlled by a controller 54 which controllably adjusts a supply valve 56. The pressure of hydrogen flowing through the supply line 52 may additionally be controlled by a supply regulator 58. The pressure of the reactant in the anode flow field 48 and the reactant in the cathode flow field 38 are preferably about the same level. The present example operates with reactants at near ambient pressure, but higher pressure operation is also possible.

All the cathode flow fields 38 are supplied with ambient air via an air blower or compressor 60 and an air line 62. The oxygen used in the electrochemical reaction is thus derived from the ambient air. The oxygen may also be supplied to the air blower or compressor 60 from a pressurized oxygen source 61. An air valve 63 may be employed for preventing coolant from draining from the cathode reactant flow field 38 if, as an option under one embodiment of the invention, the reactant flow field is flooded with coolant during power plant shutdown. However, air valve 63 may be eliminated if the reactant flow field is not to be flooded or when using other means for preventing the coolant from draining out of the cathode reactant flow field, as for instance if an air exit manifold were positioned at the highest point of the cathode flow field. The air valve 63, typically employed in a single-pass cathode flow field, has an input coupled to an output port of the cathode flow field 38 and an output coupled to an air exhaust line 65 and is controllably opened and closed by the controller 54 via a control line 67. In addition to controlling the air valve 63, the controller 54 also actuates the air blower or compressor 60.

An optional extension 62' of air line 62 is connectable to the anode reactant flow field 48, as via a connection at one end to the hydrogen reactant supply line 52 downstream of the fuel valve 56 and a selectively controllable connection at the other end to the air line 62 via multi-way valve 69. Valve 69 is controlled via a control line 71 to control the use of air as a purging agent, as will be described below.

Coolant water is circulated through the power plant cell units via line 64. The coolant water passes through the coolant flow fields or passages 36 between the plates 12 and 14. Circulation of the coolant water is driven by a fixed or variable speed pump 66 which is actuated by controller 54. The coolant water circulating loop no includes a heat exchanger 68 which lowers the temperature of the water exiting from the coolant passages 36, a valve 78, and a water accumulator 70 which includes an overflow drain line 72, a drain valve 74, a vent line 75 and a level sensor 76 for controllably opening and closing the drain valve. The accumulator 70 can be positioned above or below the cell stack assembly, and the water volume held by the accumulator and coolant channels must be sufficient to fill both substrates 22 and 26. The substrates 22 and 26 fill at shutdown because of the capillary forces drawing water into their pores. As a result, the accumulator 70 can actually be at a position below the cell stack and the substrates 22 and 26 will still fill. For hydrophilic substrates with pore diameters of about 40 microns, water will rise, or wick, upwardly as much as 26 inches. In an optional mode, the water volume should also be sufficient to fill the reactant flow fields 38 and/or 48. A pressure transducer 77 communicating with the coolant flow field 36 and either the cathode reactant flow field 38 (as shown) or the anode reactant flow field 48 maintains the coolant flow field 36 at a lower pressure than that of the respective reactant flow field, in this instance cathode reactant flow field 38, for reasons to be explained below.

During initial start-up of the power plant 10, the coolant water loop 64,36 is filled with coolant water. The water pump 66 is actuated by the controller 54 to create a circulating flow of coolant water, and the control of the coolant and reactant pressures at start-up will be described later in greater detail. Following start-up, the controller 54 then adjustably opens the valve 56 such that hydrogen reactant is admitted into the anode side of each of the cells in the power plant 10 at a predetermined pressure controlled by the controller 54 and/or the supply regulator 58, and the controller actuates the blower or compressor 60 such that oxidant is admitted into the cathode side of each of the power plant cells. The controller 54 controllably actuates and adjusts the flow of the coolant and reactant flow fields 36, 38, 48 in conjunction with the pressure transducer 77 in order to maintain the coolant flow field 36 at a lower pressure than that of the anode and cathode flow fields 48, 38. The pressure differential is in the range of about 2 to 3 psi during normal on load operation, and may be designated $\Delta P_1$.

Figure 4A:
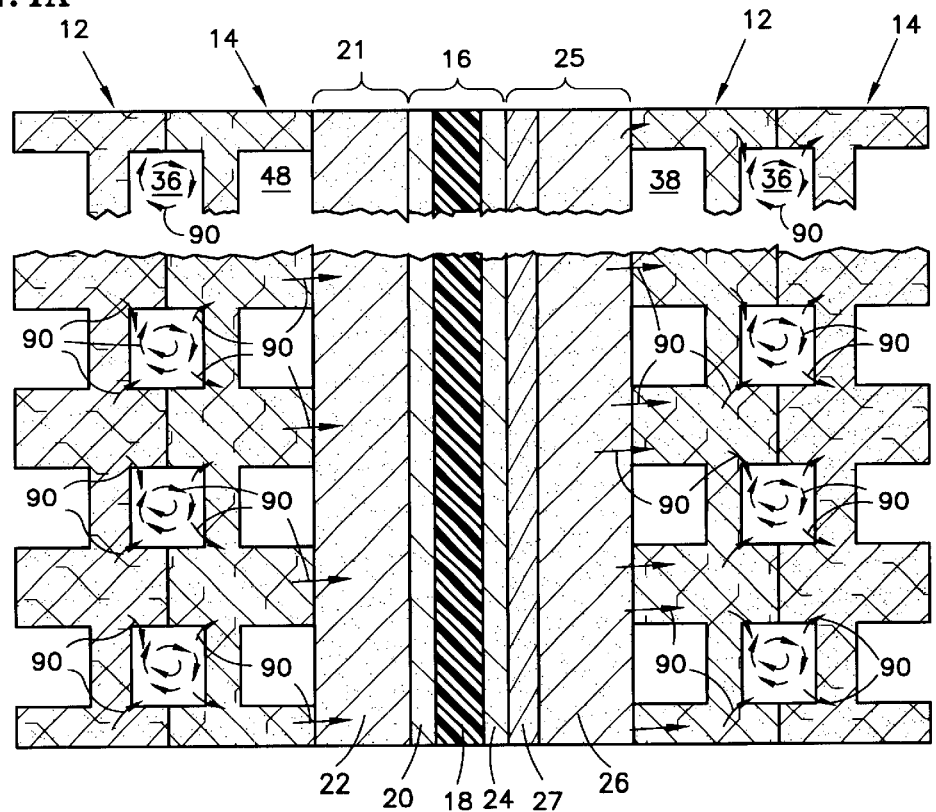
FIG. 4A is a view of a portion of the anode and cathode support plates of FIG. 3A, illustrating the relative distribution of coolant during on load operation when the reactants are at a pressure greater than the coolant to create a first pressure differential sufficient to exclude coolant from the reactant flow passages.

During power plant operation, a limited portion of the circulating coolant water will migrate through the porous plates 14, into the projections 42 and against the anode side of the membrane 18. Any water which migrates through the membrane 18 from the anode side, as well as product water which is formed on the cathode side of the membrane 18 by the electrochemical reaction, is drawn by the pressure differential between the coolant flow field 36 and the oxidant flow field 38 into the cathode plate projections 30, and passes through the plate 12 into the water coolant flow field 36. This limited flow of the coolant water is depicted in FIG. 4A in which the arrows 90 are representative of the presence of water. Because of the greater pressure of the reactant gases, it is seen that the water is principally confined to the coolant water flow fields, with a limited amount passing through the projections 42 of the fine pore plates 12,14, either to the anode side or from the cathode side of the MEA 16. Some water will also be evaporated into the oxidant stream and will vent from the system in the air stream exhaust. The excess product water that is formed in the electrochemical reaction will be pumped into the line 64 along with the coolant water. All of the water in the coolant loop will be cooled in the heat exchanger 68, and excess product water in the loop will pass through a valve 74 and be drained from the accumulator 70. By providing a circulating coolant water supply for each cell in the power plant 10, each cell has an "on-demand" supply of coolant water so that each cell will have the optimum water supply for its operating temperature, which is preferably between 140° F. to approximately 180° F., so that the coolant remains in its liquid state at near atmospheric operating pressures.

The optimum water supply means that local water transport through the fine pore plates 12, 14 adds or removes water from reactant passages to maintain a saturated condition at all locations within the cells. With the constant supply of liquid water coolant, any cell which varies from the desired nominal operating temperature will receive sufficient water to maintain the cell in a water balanced condition. When the cells in the power plant 10 are operating within the approximately 140° F. to approximately 180° F. temperature range, a typical solid polymer electrolyte power plant with one hundred cells, each being one square foot in area and formed in accordance with this invention can produce a power output of about twenty-two kilowatts, i.e., about 0.225 kilowatts per cell. In order to maintain the desired cell operating temperature range, and therefore the power output, the heat exchanger 68 will maintain the temperature of the water emitted therefrom in the range of about 120° F. to about 150° F. To this end, the heat exchanger will preferably be controlled by a thermostat 80 which senses the temperature of the water stream exiting the heat exchanger 68.

During power plant shutdown, the controller 54 closes the supply valve 56 to stop the flow of fuel through the anode reactant flow fields 48, deactivates air blower or compressor 60 to stop the flow of air or oxygen through the cathode reactant flow fields 38, and stops, or slows, the pump 66 to stop, or slow, the flow of coolant through the coolant flow fields 36. In addition, if the accumulator 70 is above the stack, the controller 54 may act to close the air valve 63 to inhibit or prevent coolant from draining out of the cathode reactant flow fields 38. Before power plant shutdown, the coolant circulating through the coolant flow field 36 was prevented from entering the anode reactant flow field 48 and the cathode reactant flow field 38 by maintaining the respective reactant gases in these flow fields at a pressure which is 2 or 3 psi greater than that of the coolant, resulting in pressure differential $\Delta P_1$. That condition was seen in FIG. 4A in which the coolant, represented by arrows 90, was excluded from the reactant flow fields and was in limited availability to the support plates 21 and 25 and the MEA 16 through the projections 42 of the flow field plates 12,14.

Upon shutdown, however, the pressure levels in the reactant gas flow fields 38,48 go substantially to ambient pressure, and the pressure of the coolant medium similarly moves to near, or slightly below or above ambient pressure. The coolant flow field 36 may have been operating at a small suction less than ambient pressure, and that pressure is regulated during shutdown to achieve the desired rate and degree of flooding, first, the substrates 22,26 and then, optionally, the reactant flow fields 38,48. The new pressure differential, $\Delta P_2$, of the coolant flow field relative to the reactant flow fields is then such, relative to $\Delta P_1$, to allow coolant to readily move into substrates 22,26. This results in the condition depicted in FIG. 4B, in which coolant, represented by arrows 90, rapidly migrates through the projections 42 of the flow field plates 12,14 and floods both wettable substrates 22,26. The pressure differential $\Delta P_2$ need only be a relatively small amount less than the 2 to 3 psi pressure differential $\Delta P_1$ in order for coolant to migrate into the wettable substrates 22,26. For instance, if the pressure of the coolant is greater than, or substantially equal to, or even about 1 psi less than the pressure of the reactant fields, the coolant will migrate into the wettable substrates 22,26.

This migration of coolant from the flow field plates 12,14 to the wettable substrates 22,26 occurs at least in part as the result of capillary forces, or wicking, when the pressure of the coolant is greater, substantially the same as, or even a little less, e.g., 1 psi less, than the pressure in the reactant flow fields. The relatively small pore sizes and the wettable characteristic of the substrates 22,26 facilitate the transfer of water coolant from the large coolant channels 36 through the fine pore plates 12,14 and into the pores of those substrates, where it is retained. Assuming an average pore size of about 40 microns in the wettable substrates 22,26, those substrates will remain filled with water so long as the pressure head acting against such retention is not greater than about 26–28 inches of water. Importantly, the average pore size in wettable substrates 22,26 should be selected small enough to retain the water coolant in the substrates without slumping. "Slumping" is the condition of being unable to retain a given quantity of the relevant liquid in all sections of its pores, with the result that parts of the structure are depleted of liquid. This condition is the result of several parameters associated with the structure and its environs, including pore size, wettability, liquid pressure head, etc. Thus, the pores in the wettable substrates 22,26 should be small enough to prevent coolant slumping with the pressure head created by the height of the wettable substrates, which may typically be in the range of 6 to 15 inches.

The wettable substrates 22,26 immediately adjacent to the respective reactant flow field plates 14,12 quickly flood because of the small pore sizes and the wettable character of the substrates. This flooded region creates an immediate barrier between the MEA 16 and any remaining reactants and/or heterogeneous gas atmosphere in the respective reactant flow fields 38,48. In this way, the fuel cell system 10 is promptly inerted by the protective barrier formed by the coolant in the flooded wettable substrates. The flooding of the substrates 22,26 is controlled such that it occurs as rapidly as possible to obtain the desired inerting of the fuel cell system 10. As mentioned earlier with reference to U.S. Ser. No. 09/133,768, the mechanism of coolant migrating from the coolant flow fields 36 through the fine pore plates 12,14 into the reactant flow fields 38,48 may provide a speed advantage over a serial purge of those reactant flow fields, especially where those reactant flow fields are formed by lengthy serial, or serially-cascaded, runs of the reactant flow paths. This benefit applies similarly, or even more so, in the present instance where the coolant migrates quickly "in parallel" into the wettable substrates 22,26 at substantially the same instant throughout the system, without requiring a serial transit of a possibly lengthy reactant flow path.

Figure 4B:
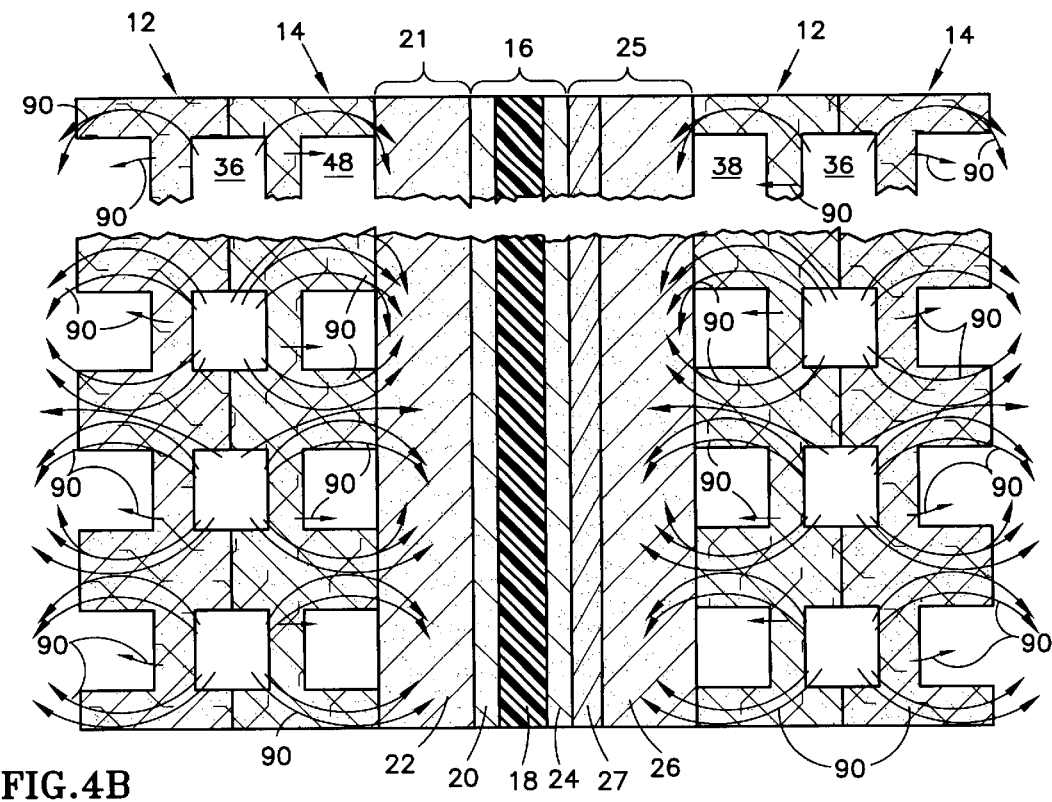
FIG. 4B is a view of a portion of the anode and cathode plates similar to FIG. 4A, but illustrating, in accordance with the invention, the coolant protectively dispersed into the hydrophilic (wettable) substrates during shutdown and/or at start-up, at a second pressure differential when the pressure difference between the reactants and coolant is reduced sufficiently, or is sufficiently small, to allow coolant to enter the wettable substrates.
Figure 4C:
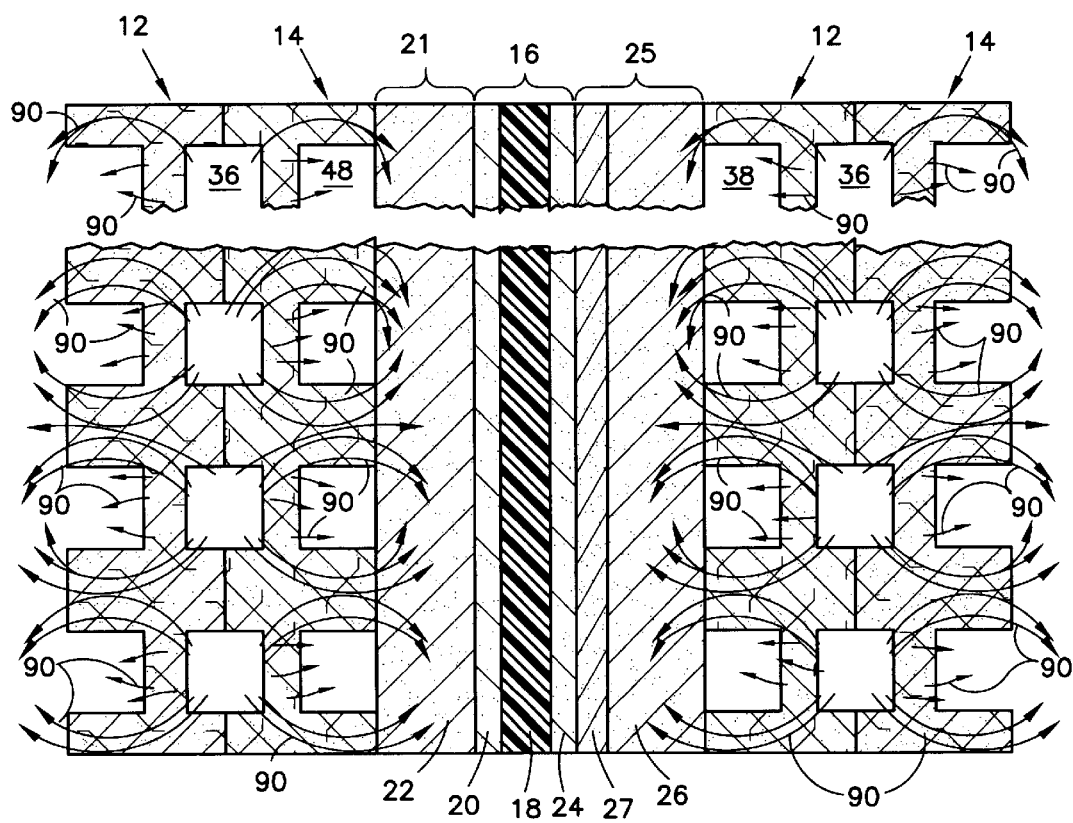
FIG. 4C is a view of a portion of the anode and cathode plates similar to FIG. 4B, but illustrating a further reduction in the pressure difference between the reactants and the coolant sufficient to allow coolant to also flood the reactant flow paths to supplementally inert the fuel cell system.

In addition to the foregoing use of the wettable substrates 22,26 to inert the fuel cell system, an optional supplemental inerting mechanism may also be realized by controlling the relative pressures between the reactant flow fields 38,48 and the coolant flow field 36 and by regulating the volume of water coolant available, so as to flood the reactant flow fields 38,48 as well as the wettable substrates 22,26. This has the further effect of purging reactant gases from the reactant flow fields 38,48. This condition is depicted in FIG. 4C wherein the coolant represented by arrows 90 is seen to not only have flooded the wettable substrates 22,26, but also to have flooded the reactant flow fields 38,48. This condition may be obtained by substantially eliminating any pressure differential in which the pressure in the reactant flow fields is greater than the pressure in the coolant flow field. This condition will be slower to occur than the protective mechanism afforded by flooding the wettable substrates 22,26, and care must be taken to prevent flooding the fuel cell system to the extent that it slows or impedes recovery upon start up.

Depending on the thickness of the respective cathode and anode diffusion layers 27 and/or 23, the potentials of the respective electrodes may increase or decrease, but not to a detrimental level. In the embodiment depicted in FIG. 1 in which there is no diffusion layer on the anode and only a thin diffusion layer 27 on the cathode, air trapped in the cathode diffusion layer 27 will cause the anode potential to temporarily rise to some intermediate level (between zero and cathode potential). Since this potential is typically less than one volt, it is not detrimental and soon disappears. To the extent there are differences between the anode and cathode substrates 22,26 and/or diffusion layers 27 and/or 23, it is generally desirable to have the cathode substrate 26 flood first to bring the potential of the cathode down.

An optional further supplemental purge of the fuel reactant flow field 48 may be conducted at this phase of the shutdown process to assure complete purging of the fuel. In this regard, the multi-way valve 69, which normally directs air flowing in air line 62 into the cathode reactant flow field 38, is temporarily switched by controller 54 via control line 71. The valve 69 is switched to prevent flow of air to the cathode reactant flow field 38, and to open or allow flow of air to extension line 62'. The controller 54 temporarily activates blower 60 to provide an air flow which is directed through extension line 62' to fuel supply line 52 and then into the fuel reactant flow field 48. Following an interval sufficient to purge any remaining fuel, the blower 60 is de-activated and the valve 69 is returned to its normal state, providing connection with the cathode reactant flow field 38. It will be understood that the reactant and coolant flow fields 38,48,36 will typically each have entry/exit manifolds (not shown), and that the air extension line 62' may be connected directly to the fuel reactant flow field manifold rather than the fuel supply line 52.

Having described normal on load operation and the inerting shutdown operation of the invention, it remains to describe in greater detail the process for starting, or re-starting, the fuel cell power system 10 from the shutdown condition. The water pump 66 is actuated by the controller 54 to create a circulating flow of coolant water at substantially ambient pressure while the reactant flow fields 38,48 are also at ambient pressure, such that any pressure differential between the reactants and coolant is relatively small, i.e., like $\Delta P_2$. This assure that the wettable substrates 22,26 are flooded, or remain flooded, to protect the MEA 16 from any heterogeneous mixture of gases (e.g., fuel and air), as seen in FIG. 4B. At this time, the anode reactant flow field can be purged with fuel to displace any heterogeneous gas mixture and coolant, and replace it with the homogeneous fuel mixture. Then the start-up can be completed by relatively increasing the reactant gas pressures and/or decreasing the coolant flow pressure, to establish the operating pressure differential $\Delta P_1$ that un-floods the wettable substrates 22,26 and the reactant flow fields 38,48 and maintains them un-flooded during normal on load operation.

Although the invention has been described and illustrated with respect to the exemplary embodiments thereof, it should be understood by those skilled in the art that the foregoing and various other changes, omissions and additions may be made without departing from the spirit and scope of the invention. For instance, an alternative to the inclusion of the reactant flow fields 38,48 in the fine pore, flow field plates 12,14 would be the formation of those reactant flow field channels, or grooves, directly in the surface region of the wettable substrates 22,26, with the plates 12,14 being adjacent thereto and forming a boundry thereof. Additionally, the reactant flow field could be defined within a wettable substrate without channels or grooves by adjusting the porosity and pore size of the substrate.

What is claimed is:

1. A method of inerting a fuel cell system (10) having a membrane/electrode assembly (MEA) (16), which MEA includes anode and cathode electrode catalyst layers (20,24) on respectively opposite sides of the membrane (18), and having a respective support plate (21,25) comprising a respective substrate (22,26) at at least one of the anode and cathode catalyst layers (20,24), the method comprising:

(a) providing at least one of the substrates (22,26) as a wettable substrate;

(b) providing a reactant flow field (38,48) adjacent the respective at least one wettable substrate;

(c) providing at least one fine pore plate (12,14) adjacent the respective at least one wettable substrate and including a coolant flow field (36) spaced farther from the membrane (18) relative to the reactant flow field (38,48);

(d) operating the reactant flow field (38,48) at a first pressure during on load operation of the fuel cell system (10);

(e) operating the coolant flow field (36) at a second pressure during on load operation of the fuel cell system, the second pressure being lower than that of the first pressure to create a first pressure differential ($\Delta P_1$) therebetween sufficient to substantially exclude coolant from the reactant flow field (38,48) and to limit availability of coolant to the wettable substrate (22,26); and (f) during fuel cell shutdown, operating the reactant flow field at a third pressure level and operating the coolant flow field at a fourth pressure level, the fourth pressure level being such relative to the third pressure level as to provide a second pressure differential ($\Delta P_2$) sufficient to allow the coolant to migrate through the respective fine pore plate (12,14) and flood the respective wettable substrate (26,22) to isolate the respective catalyst layer (24,20) of the MEA from the respective reactant.

2. The fuel cell system inerting method of claim 1, wherein (a) the step of providing at least one wettable substrate includes providing a first support plate (21) comprising a first wettable substrate (22) at the anode side of the MEA and providing a second support plate (25) comprising a second wettable substrate (26) at the cathode side of the MEA;

(b) the step of providing at least one fine pore plate includes providing a first fine pore plate (14) positioned adjacent the first wettable substrate (22) and including a fuel reactant flow field (48) adjacent to the first wettable substrate and a coolant flow field (36) spaced farther from the membrane relative to the fuel reactant flow field and providing a second fine pore plate (12) positioned adjacent the second wettable substrate (26) and including an oxidant reactant flow field (38) adjacent to the second wettable substrate and a coolant flow field (36) spaced farther from the membrane relative to the oxidant flow field;

(c) the step of operating the reactant flow field at a first pressure comprises operating one of the fuel and the oxidant reactant flow fields at the first pressure and the other of the fuel and the oxidant reactant flow fields at a fifth pressure, the fifth pressure also being higher than the second pressure at which the coolant flow field is operated; and (d) the step of operating the reactant flow field at a third pressure level during shutdown comprises stopping the respective fuel and oxidant gas flows, whereby the third pressure level is substantially ambient pressure, and operating the coolant flow field at a fourth pressure during shutdown comprises maintaining a coolant flow field pressure level substantially equal to or below the third pressure level to flood the first and second wettable substrates by capillary forces.

3. The fuel cell system inerting method of claim 2, wherein the step of operating the coolant flow field at a fourth pressure level during shutdown comprises stopping the coolant flow field, whereby the fourth pressure level is substantially ambient pressure.

4. The fuel cell system inerting method of claim 2, wherein the first support plate (21) is positioned adjacent the anode catalyst layer (20) and the second support plate (25) is positioned adjacent the cathode catalyst layer (24) of the MEA, and providing a non-wettable diffusion layer (27,23) intermediate the respective wettable substrate and electrode catalyst layer for at least the second support plate.

5. The fuel cell system inerting method of claim 2 including the further step of purging the fuel flow field (48) with air (61) during fuel cell shutdown following the equilibration of the pressure levels of the fuel reactant and the coolant.

6. The fuel cell system inerting method of claim 1 wherein the height of the wettable substrate (22,26) establishes a coolant pressure head vertically thereacross, and wherein the step of providing at least one of the substrates as a wettable substrate comprises providing each such wettable substrate with pores sized sufficiently small to prevent coolant slumping with the pressure head created by the height of the wettable substrate.

7. The fuel cell system inerting method of claim 6 wherein the step of providing the wettable substrate (22,26) with pores small enough to prevent slumping comprises providing the majority of the pores having sizes within the range of 20 to 50 microns.

8. The fuel cell system inerting method of claim 2 wherein the height of the wettable substrates (22,26) establishes a coolant pressure head vertically thereacross, and wherein the step of providing first and second wettable substrates comprises providing each such substrate with pores sized sufficiently small to prevent coolant slumping with the pressure head created by the height of the wettable substrates.

9. The fuel cell system inerting method of claim 1, including the further step of start-up comprising:

(a) operating the respective reactant flow field (38,48) and the respective coolant flow field (36) at substantially equal pressure levels to flood, or maintain flooded, the respective at least one wettable substrate (22,26);

(b) purging the reactant flow field (38,48) with the respective reactant (61,50) until the flow field contains a homogeneous mixture of the reactant; and (c) starting the coolant flow and the reactant flow and operating the coolant flow field (36) at a pressure level sufficiently lower than the respective reactant pressure level to un-flood the respective at least one wettable substrate (22,26).

10. The fuel cell system inerting method of claim 9 wherein the at least one wettable substrate (22) is positioned at the anode side of the MEA, the at least one fine pore plate (14) positioned adjacent the respective at least one wettable substrate (22) includes a fuel reactant flow field (48), and the purging of the reactant flow field is with the fuel (50) until a homogeneous mixture of the fuel is present throughout the flow field.

11. The fuel cell system inerting method of claim 1 further including the step of further controlling (54,56) the supply (70) of coolant and the pressure (77) of the coolant relative to the pressure of the reactant to allow coolant to migrate through the fine pore plate (12,14) and flood the reactant flow field (38,48), thereby inerting the reactant flow field and supplementally inerting the fuel cell system.

12. A method of inerting and starting a fuel cell system (10) having a membrane/electrode assembly (MEA) (16), which MEA includes anode and cathode electrode catalyst layers (20,24) on respectively opposite sides of the membrane (18), and having a respective substrate (22,26) at at least one of the anode and cathode catalyst layers (20,24), the method comprising:

(a) providing at least one of the substrates (22,26) as a wettable substrate;

(b) providing a reactant flow field 38,48) adjacent the at least one wettable substrate;

(c) providing at least one fine pore plate (12,14) positioned adjacent the respective at least one wettable substrate and including a coolant flow field (36) spaced farther from the membrane (18) relative to the reactant flow field (38,48);

(d) during shutdown and initially during start-up, operating the respective reactant flow field 38,48) at one pressure level and operating the respective coolant flow field (36) at another pressure level, the relative pressures of the one pressure level and the other pressure level being such that coolant migrates through the respective fine pore plate (12,14) and floods, or maintains flooded, the wettable substrate (22,26) to isolate the respective catalyst layer (20,24) of the MEA from the respective reactant;

(e) purging the reactant flow field (38,48) with the respective reactant (61,50) during -tart-up until a homogeneous mixture of the reactant is present throughout the flow field; and (f) operating the coolant field (36) and the reactant flow field (38,48) at different pressure levels for completing start-up and providing on load operation of the fuel cell system, the coolant flow field being operated at a pressure level less than the pressure level at which the reactant flow field is operated to un-flood the wettable substrate and permit passage of the reactant to the respective electrode catalyst.

13. A fuel cell system (10) having a membrane/electrode assembly (MEA) (16), the MEA including anode and cathode electrode catalyst layers (20,24) on respectively opposite sides of the membrane (18), and having a respective support plate (21,25) comprising a respective substrate (22, 26) at at least one of the anode and cathode catalyst layers (20,24), the fuel cell system further comprising:

(a) at least one of the substrates (22,26) being a wettable substrate;

(b) means (12,14,22,26) for providing at least one reactant flow field (38,48);

(c) at least one fine pore plate (12,14) adjacent to the respective at least one wettable substrate (22,26) and including a coolant flow field (36) spaced farther from the membrane (18) relative to the respective reactant flow field (38,48);

(d) reactant pressure means (50,56;61,60) for operating the at least one of the reactant flow fields (38,48) at a first pressure during on load operation of the fuel cell system (10);

(e) coolant pressure means (70,78,66) for operating the coolant flow field (36) at a second pressure during on load operation of the fuel cell system, the second pressure being lower than that of the first pressure to create a first pressure differential ($\Delta P_1$) therebetween sufficient to substantially exclude coolant from the reactant flow field (38,48) and to limit availability of coolant to the wettable substrate (22,26); and (f) a controller (54) for operating the reactant flow field at a third pressure level and operating the coolant flow field at a fourth pressure level during fuel cell shutdown, the fourth pressure level being such relative to the third pressure level as to provide a second pressure differential ($\Delta P_2$) sufficient to allow the coolant to migrate through the respective fine pore plate (12,14) and flood the respective wettable substrate (26,22) to isolate the respective catalyst layer (24,20) of the MEA from the respective reactant, and thereby inert the fuel cell system.

14. The fuel cell system of claim 13, wherein (a) the at least one wettable substrate comprises a first support plate (21) having a first wettable substrate (22) at the anode side of the MEA and a second support plate (25) having a second wettable substrate (26) at the cathode side of the MEA;

(b) the at least one fine pore plate comprises a first fine pore plate (14) positioned adjacent the first wettable substrate (22) and including a fuel reactant flow field (48) adjacent to the first wettable substrate (22) and a coolant flow field (36) spaced farther from the membrane relative to the fuel reactant flow field and a second fine pore plate (12) positioned adjacent the second wettable substrate (26) and including an oxidant reactant flow field (38) adjacent to the second wettable substrate and a coolant flow field (36) spaced farther from the membrane relative to the oxidant flow field;

(c) the reactant pressure means (61,60;50,56) operate the fuel and the oxidant reactant flow fields at a pressure higher than the second pressure at which the coolant flow field is operated; and (d) wherein the controller (54) stops the reactant pressure means during shutdown whereby the third pressure level is substantially ambient pressure, and the controller (54)operates the coolant pressure means during shutdown to maintain a coolant flow field pressure level substantially equal to or below the third pressure level to flood the first and second wettable substrates by capillary forces.

15. The fuel cell system of claim 14, wherein the controller (54) stops the coolant pressure means (70,78,66) during shutdown, whereby the fourth pressure level is substantially ambient pressure.

16. The fuel cell system of claim 14, wherein the first support plate (21) is positioned adjacent the anode catalyst layer (20) and the second support plate (25) is positioned adjacent the cathode catalyst layer (24) of the MEA, and further including a non-wettable diffusion layer (27,23) intermediate the respective wettable substrate and electrode catalyst layer for at least the second support plate.

17. The fuel cell system of claim 14 including means (61,60,69,62') for purging the fuel flow field (48) with air (61) during fuel cell shutdown following the equilibration of the pressure levels of the fuel reactant and the coolant.

18. The fuel cell system of claim 13 wherein the height of the wettable substrate (22,26) establishes a coolant pressure head vertically thereacross, and each wettable substrate is provided with pores sized sufficiently small to prevent coolant slumping with the pressure head created by the height of the wettable substrate.

19. The fuel cell system of claim 18 wherein the majority of the pores in the wettable substrate (22,26) have sizes within the range of 20 to 50 microns.

20. The fuel cell system of claim 14 wherein the height of the wettable substrates (22,26) establishes a coolant pressure head vertically thereacross, and the first and second wettable substrates are each provided with pores sized sufficiently small to prevent coolant slumping with the pressure head created by the height of the wettable substrates.

* * * * *